(12) United States Patent
Shieh et al.

(10) Patent No.: US 7,258,111 B2
(45) Date of Patent: Aug. 21, 2007

(54) OIL SEPARATOR

(75) Inventors: Teng-Hua Shieh, Ann Arbor, MI (US);
Erik J. Oberg, Brighton, MI (US)

(73) Assignee: Toyota Motor Engineering & Manufacturing North America, Inc., Ann Arbor, MI (US)

( * ) Notice: Subject to any disclaimer, the term of this patent is extended or adjusted under 35 U.S.C. 154(b) by 0 days.

(21) Appl. No.: 11/492,427

(22) Filed: Jul. 25, 2006

(65) Prior Publication Data

US 2006/0260589 A1 Nov. 23, 2006

Related U.S. Application Data

(62) Division of application No. 11/123,618, filed on May 6, 2005.

(51) Int. Cl.
*F02F 9/00* (2006.01)

(52) U.S. Cl. .................................................. 123/572

(58) Field of Classification Search ........ 123/572–574, 123/41.86
See application file for complete search history.

(56) References Cited

U.S. PATENT DOCUMENTS

| | | | |
|---|---|---|---|
| 3,678,910 A * | 7/1972 | Marlett ........................ 123/574 |
| 4,580,543 A | 4/1986 | Aoki | |
| 4,856,487 A | 8/1989 | Furuya | |
| 5,005,553 A * | 4/1991 | Washizu et al. ............. 123/572 |
| 5,090,393 A | 2/1992 | Holch | |
| 5,239,972 A | 8/1993 | Takeyama et al. | |
| 5,335,641 A | 8/1994 | Schnabel | |
| 5,562,087 A * | 10/1996 | Wright ......................... 123/572 |
| 5,564,401 A | 10/1996 | Dickson | |
| 6,279,556 B1 | 8/2001 | Busen et al. | |
| 6,626,163 B1 | 9/2003 | Busen et al. | |
| 6,651,636 B1 * | 11/2003 | Albright ...................... 123/574 |
| 6,684,864 B1 | 2/2004 | Busen et al. | |
| 6,802,303 B2 * | 10/2004 | Håkansson ................... 123/574 |
| 6,889,674 B2 | 5/2005 | Pateman et al. | |

* cited by examiner

*Primary Examiner*—Marguerite McMahon
(74) *Attorney, Agent, or Firm*—Gifford, Krass, Sprinkle, Anderson & Citkowski, P.C.

(57) ABSTRACT

An oil separator that removes oil from ventilation gases flowing between a crankcase and an intake manifold of an internal combustion engine. The oil separator includes a housing having an inlet and an outlet. The housing includes a guide wall having a plurality of holes to allow gases to flow therethrough between the inlet and the outlet. A plate is movably coupled to the housing for movement between a closed position blocking the flow of gases through the holes in the guide wall and an open position spaced apart from the guide wall to allow gases to flow through at least one of the holes in the guide wall. A diaphragm has a movable portion coupled to the plate. The diaphragm defines a substantially closed volume continuous with the intake manifold so that pressure changes in the intake manifold causes corresponding displacement of the movable portion and the plate relative to the housing.

12 Claims, 4 Drawing Sheets

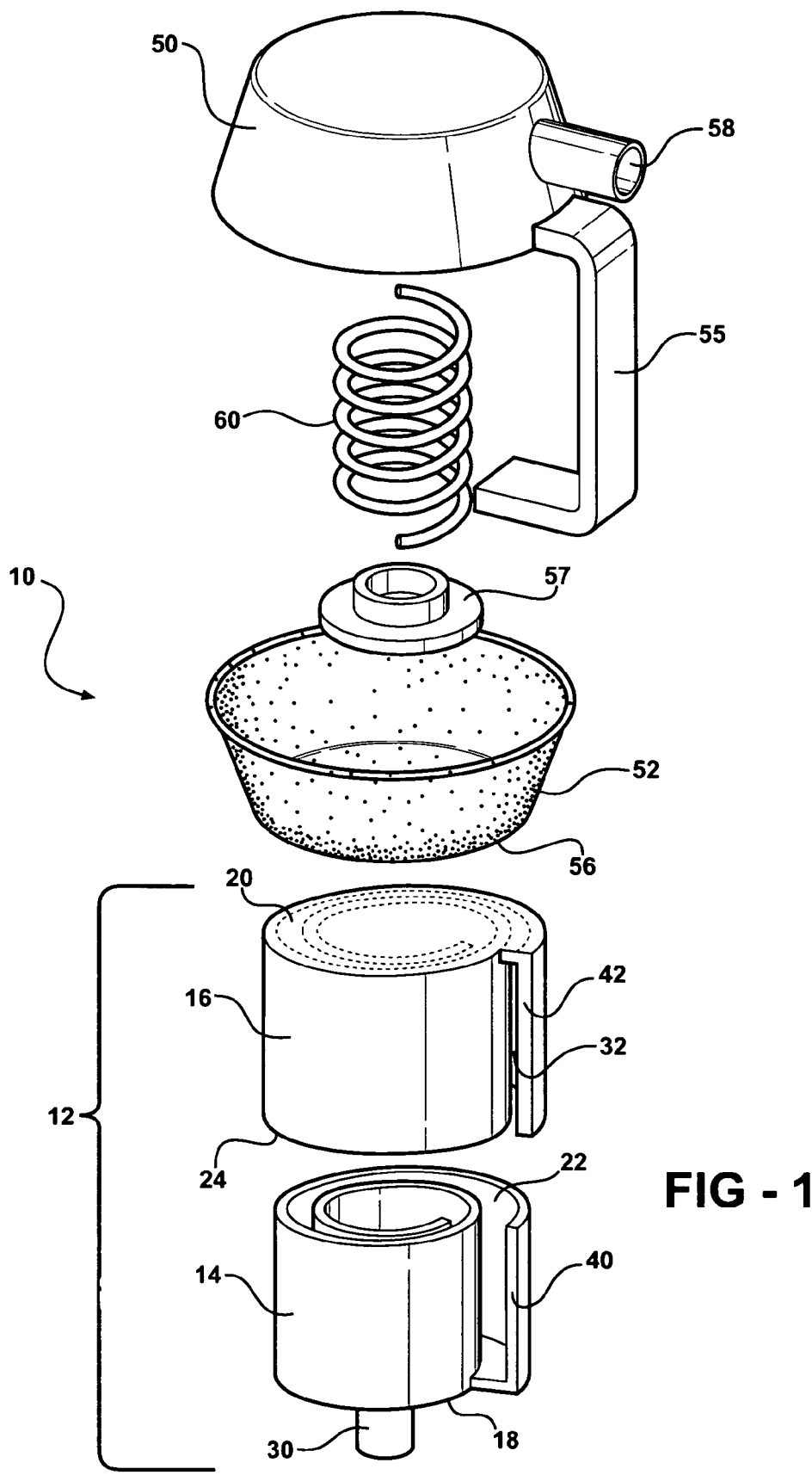

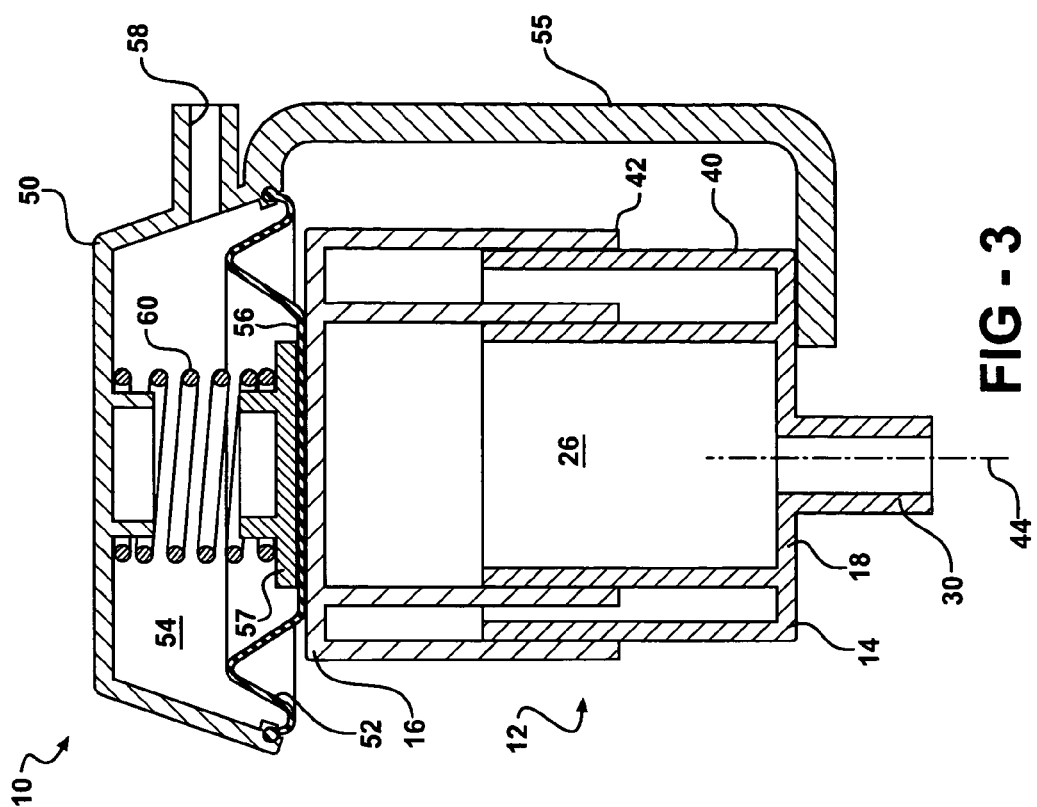
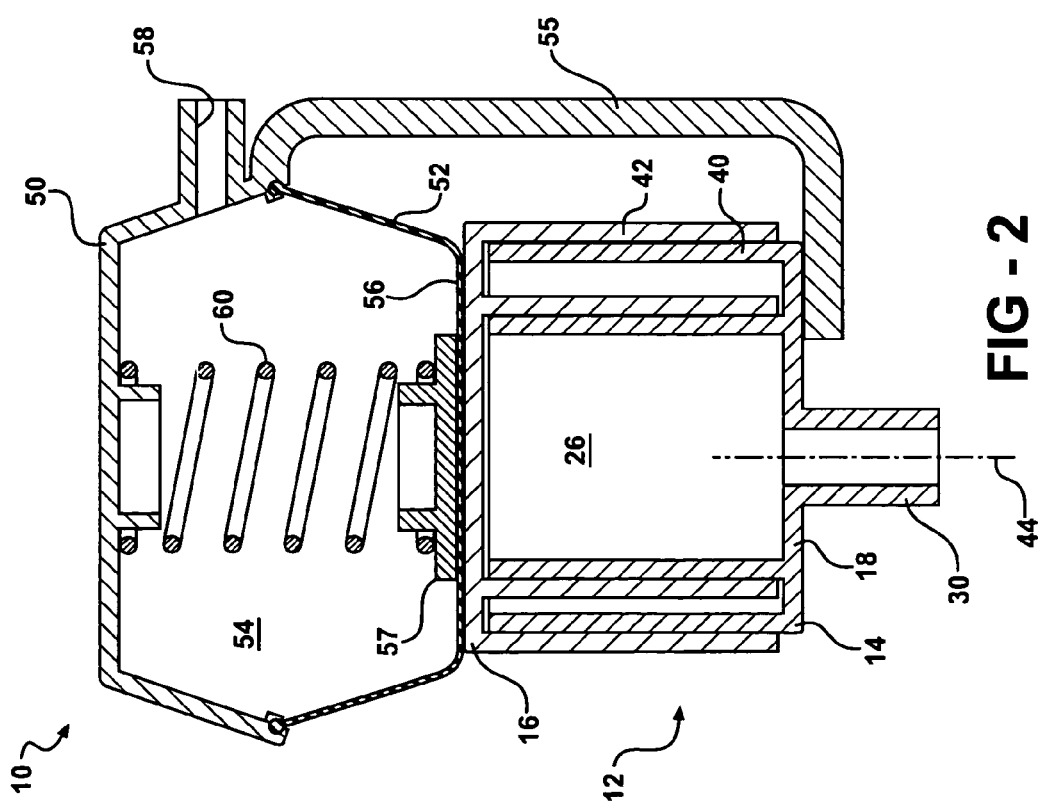

OIL SEPARATOR

CROSS REFERENCE TO RELATED APPLICATION

This application is a divisional patent application of copending U.S. patent application Ser. No. 11/123,618, which was filed on May 6, 2005 and is incorporated herein by reference in its entirety.

BACKGROUND OF THE INVENTION

1. Field of the Invention

The invention relates to an oil separator for an internal combustion engine. More particularly, the invention relates to an oil separator for removing oil from PCV gases of an internal combustion engine.

2. Description of the Related Art

An internal combustion engine typically includes a combustion chamber, where a fuel air mixture is burned to cause movement of a set of reciprocating pistons, and a crankcase, which contains the crankshaft driven by the pistons. During operation, it is normal for the engine to experience "blowby," wherein combustion gases leak past the pistons from the combustion chamber and into the crankshaft. These combustion or blowby gases contain moisture, acids and other undesired by-products of the combustion process.

An engine typically includes a Positive Crankcase Ventilation (PCV) system for removing harmful gases from the engine and prevents those gases from being expelled into the atmosphere. The PCV system does this by using manifold vacuum to draw vapors from the crankcase into the intake manifold. Vapor is then carried with the fuel/air mixture into an intake manifold of the combustion chambers where it is burned. Generally, the flow or circulation within the system is controlled by the PCV valve, which acts as both a crankcase ventilation system and as a pollution control device.

It is normal for blowby gases to also include a very fine oil mist. The oil mist is carried by the PCV system to the manifold. The oil mist is then burned in the combustion chamber along with the fuel/air mixture. This results in an increase in oil consumption. A known method of removing oil from the blowby gases is to use a labyrinth or cyclone-type separator design. A path is provided through which small oil droplets pass. The small oil droplets impact the walls of the path and coalesce into larger droplets. The droplets are then re-introduced back to a sump, which generally holds excess oil in the system. Conventional cyclone separators, however, have a fixed radius and convergent nozzle and, as a result, require a high velocity to generate a sufficient centrifugal force to promote a formation of oil film from smaller droplets. Conventional cyclone separators are also known to generate a high pressure loss. Examples of cyclone separators are disclosed in U.S. Pat. Nos. 6,279,556 B1 and 6,626,163 B1 to Busen et al., both of which are assigned to Walter Hengst GmbH & Co. KG.

Thus, it remains desirable to provide an oil separator that provides improved oil separation performance, lower pressure loss and greater system flexibility over conventional cyclone designs.

SUMMARY OF THE INVENTION

According to one aspect of the invention, an oil separator for removing oil from ventilation gases flowing between a crankcase and an intake manifold of an internal combustion engine. The oil separator includes a housing having an inlet and an outlet. The housing includes a guide wall having a plurality of holes to allow gases to flow therethrough between the inlet and the outlet. A plate is movably coupled to the housing for movement between a closed position blocking the flow of gases through the holes in the guide wall and an open position spaced apart from the guide wall to allow gases to flow through at least one of the holes in the guide wall. A diaphragm has a movable portion coupled to the plate. The diaphragm defines a substantially closed volume continuous with the intake manifold so that pressure changes in the intake manifold cause corresponding displacement of the movable portion and the plate relative to the housing.

BRIEF DESCRIPTION OF THE DRAWINGS

Advantages of the present invention will be readily appreciated as the same becomes better understood by reference to the following detailed description when considered in connection with the accompanying drawings, wherein:

FIG. 1 is an exploded view of an oil separator according to one embodiment of the invention;

FIG. 2 is a cross sectional view of the oil separator in an closed position;

FIG. 3 is a cross sectional view of the oil separator in an open position;

DETAILED DESCRIPTION OF THE INVENTION

Figure 4:
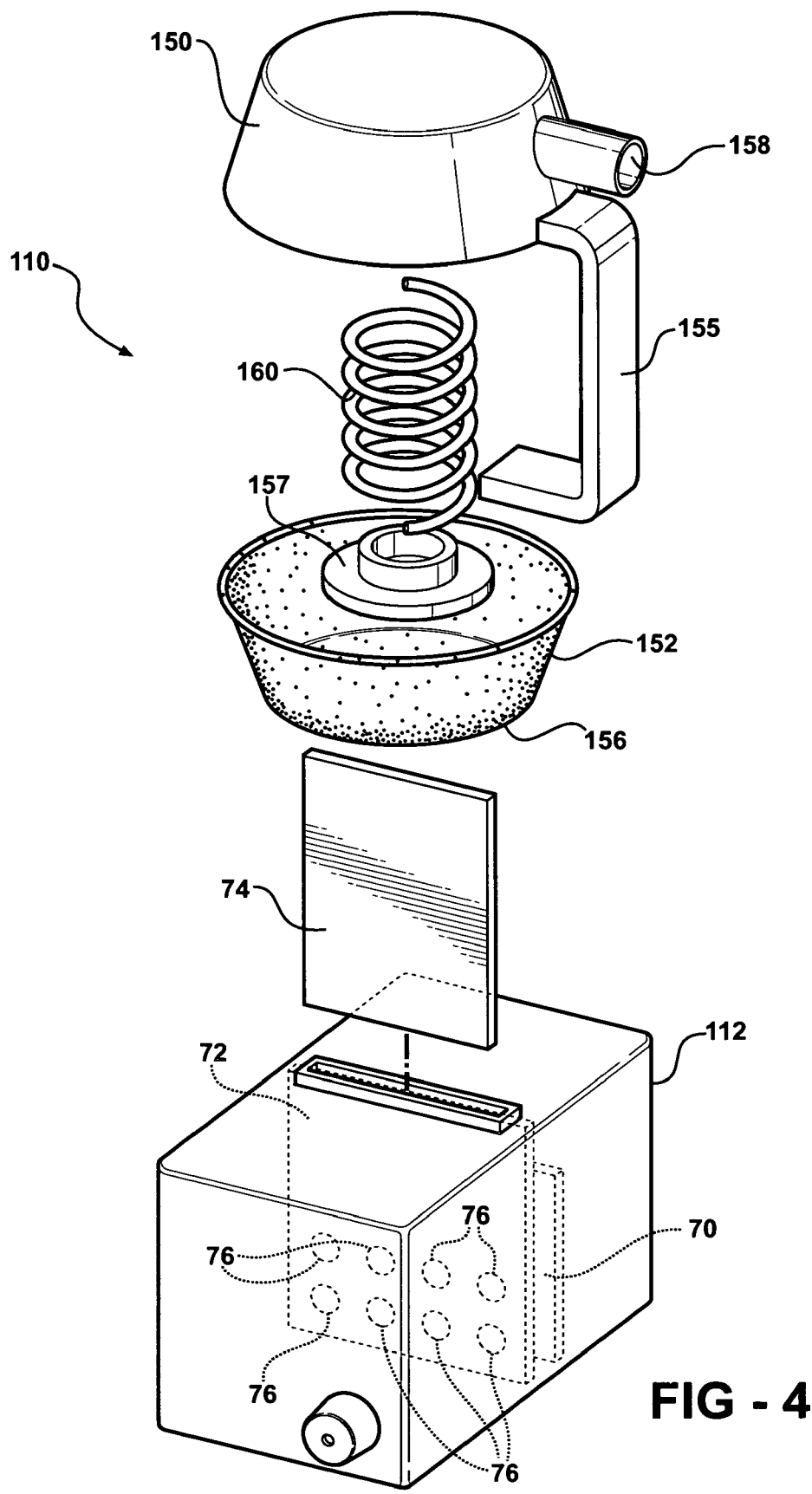
FIG. 4 is an exploded view of an oil separator according to a second embodiment of the invention.

Referring to FIGS. 1–3, an oil separator according to an embodiment of the invention is generally indicated at 10. The separator 10 includes a housing 12 having first 14 and second 16 halves. Each half 14, 16 of the housing 12 is generally cylindrical and cup shaped with a closed end 18, 20 and an open end 22, 24. The first half 14 of the housing 12 has a smaller diameter than the second half 16, so that the first half 14 can be arranged concentrically inside of the second half 16. The first 14 and second 16 halves are arranged with the open ends 22, 24 facing each other, such that a cavity 26 is defined between the closed ends 18, 20 of the first 14 and second 16 halves of the housing 12. The cavity 26 is substantially enclosed. By this arrangement, the first 14 and second 16 halves of the housing 12 can be axially displaced relative to each other in a telescopic manner. Further, the volume of the cavity 26 varies as the first 14 and second 16 halves of the housing 12 are displaced relative to each other. The housing 12 includes an outlet 30 formed in the closed end 18 of the first half 14 of the housing 12.

A spiral shaped guide 40 extends outwardly from the closed end 18 of the first half 14 of the housing 12 toward the second half 16. A spiral shaped wall 42 extends outwardly from the closed end 20 of the second half 16 toward the first half 14. The housing 12 includes an inlet 32 formed in the spiral shaped wall 42 of the second half 16. The guide 40 and wall 42 have corresponding shapes so as to divide the cavity 26 and define a continuous spiral shaped path that guides a flow of gases between the inlet 32 and the outlet 30. The guide 40 and wall 42 are slidably engaged along an axis 44. Optionally, a seal or gasket is provided between the guide 40 and wall 42 to prevent gases from leaking therebetween. The path has a width that decreases in size between the inlet 32 and the outlet 30. Preferably, the width of the path between the inlet 32 and the outlet 30 decreases at a constant rate. The function of the spiral path in the removal of oil from the crankshaft gases flowing between the inlet and the outlet of the housing is discussed in greater detail in co-pending U.S. patent application Ser. No. 10/961, 557 filed on Oct. 8, 2004, which is incorporated herein by reference in it entirety.

The path has a height that varies within a predetermined range that corresponds with sliding movement of the wall 42 relative to the guide 40 along the axis 44. More specifically, sliding the guide 40 and wall 42 apart increases the height and volume of the path, thereby increasing the amount of gases that can flow therethrough under a fixed pressure. Sliding the guide 40 and wall 42 toward each other decreases the height and volume of the path, thereby increasing flow speed under a fixed pressure drop condition.

The oil separator 10 also includes a cap 50 and a flexible diaphragm 52. The cap 50 and diaphragm 52 are each cup shaped with frustoconical walls. The cap 50 and diaphragm 52 are arranged in an inverted or opposed manner relative to each other to define a substantially closed volume or cavity 54 therebetween. The cap 50 is fixedly secured to the housing 12 by a rigid L-shaped bracket 55. The diaphragm 52 includes a movable portion or end 56 coupled to the wall 42. The diaphragm 52 is made from an elastomeric material so as to be deformable between a closed position, as shown in FIG. 2, and an open position, as shown in FIG. 3. Deformation of the diaphragm 52 between the closed and open positions causes substantially linear displacement of the end 56 of the diaphragm 52 along the axis 44. Optionally, the diaphragm is provided in the form a plurality of rigid shells arranged concentrically for telescopic movement between the open and closed position. Optionally, the diaphragm is provided in the form of a cylinder/plunger arrangement, wherein the plunger is slidably supported within the cylinder for movement between the closed and open positions. Optionally, the cap is integrally formed with the diaphragm, such that the diaphragm defines the substantially closed cavity.

A biasing member 60 is continuously energized between the cap 50 and the diaphragm 52 to bias the end 56 of the diaphragm 52 toward the closed position. Preferably, the biasing member 60 is a helical coil spring. Optionally, a washer 57 is disposed between the end 56 of the diaphragm 52 and the biasing member 60. The washer 57 includes a boss to keep the biasing member 60 centered on the end 56 of the diaphragm 52.

A conduit 58 is coupled between the cap 50 and the intake manifold (not shown) so that the cavity 54 of the diaphragm 52 is open with an atmosphere defined by the intake manifold. The diaphragm 52 stays in the closed position while the pressure of the cavity 54 remains above a threshold amount. The threshold amount is related to the predetermined spring rate of the biasing member 60. That is, it is possible for the pressure to be below ambient pressure, while the biasing member 60 maintains the end 56 of the diaphragm 52 in the closed position.

Typically, a vacuum is created in the intake manifold and cavity 54 due to decreased engine speed. The diaphragm 52 begins to deform and collapse toward the open position when the pressure in the cavity 54 falls below the threshold amount. The extent of the deformation of the diaphragm 52 and resulting displacement of the end 56 of the diaphragm 52 is proportional to the amount of change in the pressure below the threshold amount. Thus, low engine speeds will result in the formation of a large vacuum or pressure drop in the intake manifold and cavity 26. In turn, the large pressure drop below the threshold amount causes a large displacement of the end 56 and wall 42 along the axis 44 away from the guide 40. Displacement of the wall 42 away from the guide 40 increases the height of the path, thereby allowing decreased gas flow velocity between the inlet 32 and outlet 30 of the housing 12. The increased capacity of the path between the inlet 32 and outlet 30, therefore, accommodates the decreased demand from the PCV valve.

Increased engine speeds results in a pressure drop decrease between manifold and cavity 26, which tends to expand the cavity 54 and displace the end 56 of the diaphragm 52 toward the closed position. It should be appreciated that pressure increase means positive change in the pressure, although the resulting pressure may still be below ambient, i.e. a vacuum may still exist in the cavity 54. Displacement of the diaphragm 52 toward the closed position shortens the path between the inlet 32 and outlet 30, as the wall 42 is moved toward the guide 40. The shortened path allows increased gas flow velocity between the inlet 32 and outlet 30 of the housing 12 for improving oil droplet capturing function. The capacity of the path between the inlet 32 and outlet 30, therefore, increases device efficiency in response to the decreased functionality of PCV valve.

Figure 5:
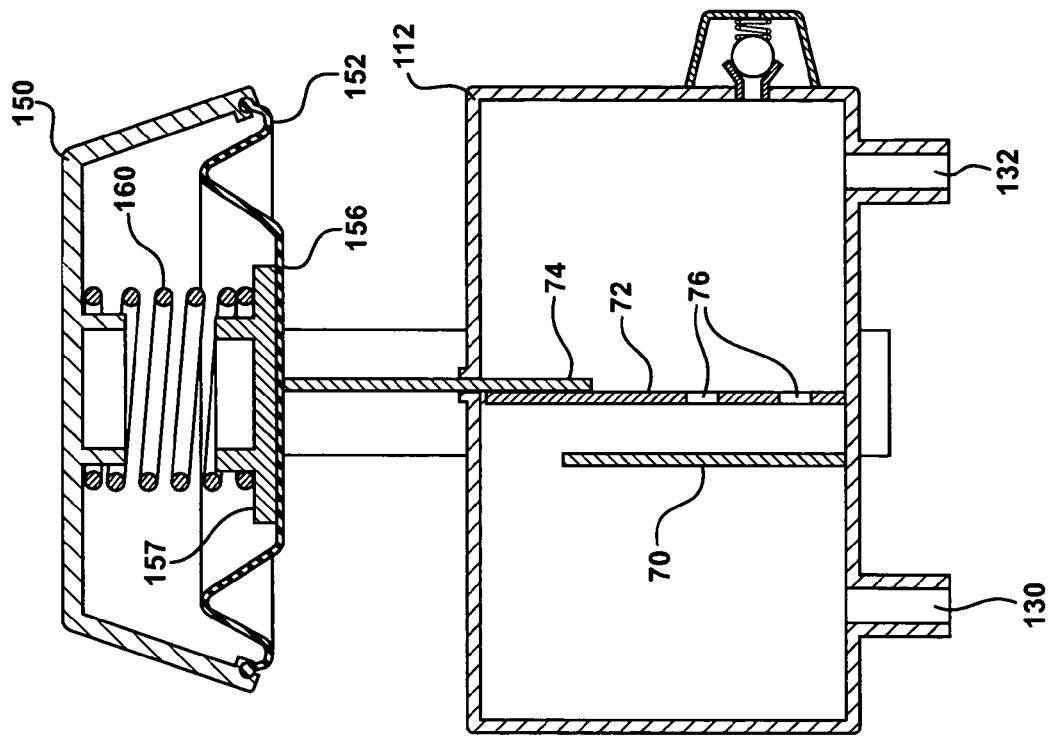
FIG. 5 is a cross sectional view of the oil separator of FIG. 4 shown in the closed position.
Figure 6:
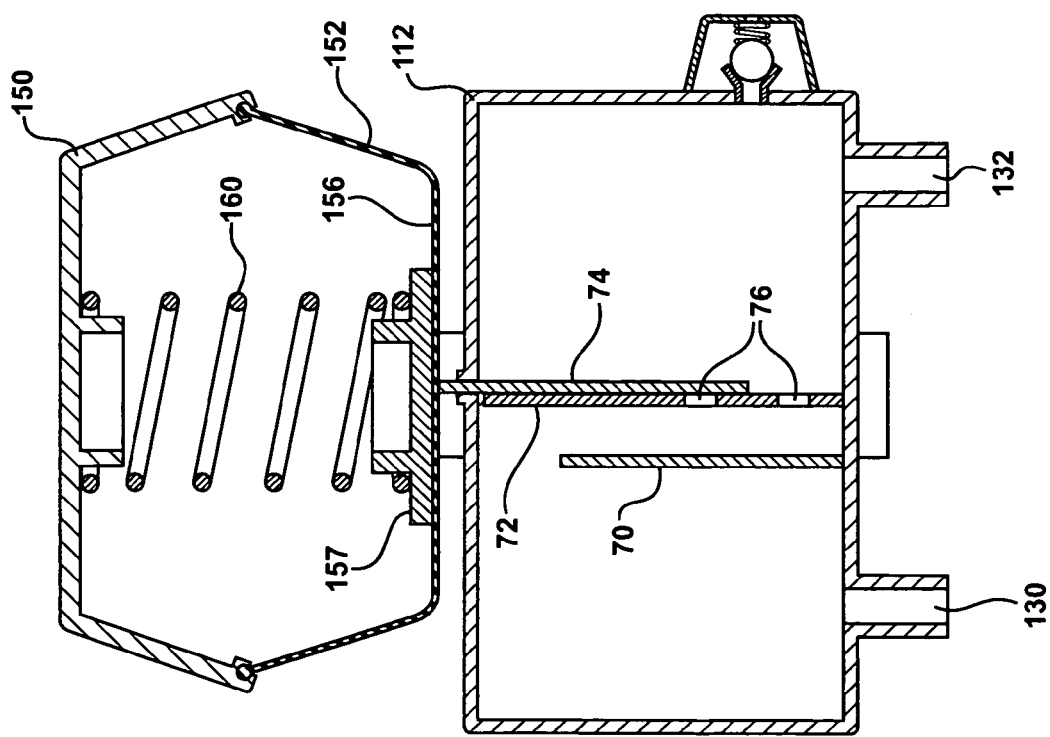
FIG. 6 is a cross sectional view of the oil separator of FIG. 4 shown in the open position.

Referring to FIGS. 4–6, a second embodiment of the oil separator is generally indicated at 110, wherein like components are referenced by numerals offset by 100. The oil separator 110 includes an impact plate 70, a guide plate 72 and a plate 74. The impact plate 70, guide plate 72 and plate 74 are each planar and substantially parallel to each other. The guide plate 72 is disposed between the impact plate 70 and the plate 74. The guide plate 72 includes a plurality of holes 76 allowing gases to flow between the inlet 132 and outlet 130 of the housing 112. Each of the plurality of holes 76 has a predetermined diameter, preferably ranging between 2 and 4 mm. The plate 74 is slidably coupled to the housing 112 and coupled to the end 156 of the diaphragm 152 for movement along a linear path between the closed position, as shown in FIG. 5, and the open position, as shown in FIG. 6.

In the closed position, the plate 74 prevents the flow of gases through all except at least one of the plurality of holes 76, therefore to increase gas flow velocity to improve oil droplet capturing efficiency. Sliding the plate 74 to the open position reveals all of the plurality (if holes 76 allowing increased gas flow through the guide plate 72 when enough flow rate is achieved to main consistent oil droplet capturing efficiency at different engine operating conditions. The plurality of holes 76 are arranged in rows normal to the linear path of the plate 74, such that movement of the plate 74 toward the open position reveals successive rows of holes 76. In either position, gases flow through the guide plate 72 and toward the impact plate 70. A high velocity impact region is formed at the impact plate 70 as gases are redirected around the impact plate 70 and toward the outlet 130. The high velocity impact region promotes coalescence due to impact and removal of oil from the gas flow.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

I claim:

1. An oil separator for removing oil from crankcase gases flowing between a crankcase and an intake manifold of an internal combustion engine, said oil separator comprising:
   a housing having an inlet and an outlet, the housing including a guide wall having a plurality of holes to allow gases to flow therethrough between the inlet and the outlet;
   a plate being movably coupled to the housing for movement between a closed position blocking the flow of gases through at least one of the holes in the guide wall and an open position spaced apart from the guide wall to allow gases to flow through all of the holes in the guide wall;
   a diaphragm having a movable portion coupled to the plate, the diaphragm defining a substantially closed volume continuous with the intake manifold so that pressure changes in the intake manifold causes corresponding displacement of the movable portion and the plate relative to the housing.

2. An oil separator as set forth in claim 1, wherein the plate is slidably coupled to the housing for movement along a path substantially parallel with the guide.

3. An oil separator as set forth in claim 1, wherein each of the plurality of holes has a predetermined diameter ranging between 2 and 4 mm.

4. An oil separator as set forth in claim 1 including a rigid cap that is cup shaped and cooperative with the diaphragm to define the substantially closed volume.

5. An oil separator as set forth in claim 4 including an L-shaped bracket fixedly connecting the cap and the housing.

6. An oil separator as set forth in claim 1 including a biasing member that continuously biases the movable portion toward the closed position.

7. An-oil separator as set forth in claim 6, wherein the biasing member is disposed in the substantially closed volume of the diaphragm.

8. An oil separator as set forth in claim, 6 wherein the biasing member is a helical coil spring having one end adjacent the cap and an opposite end adjacent the movable portion.

9. An oil separator as set forth in claim 8 including a washer disposed between the biasing member and the movable portion, the washer including a boss positioned concentrically with the opposite end of the helical coil spring for maintaining the position of the opposite end relative to the movable portion.

10. An oil separator as set forth in claim 1 including an impact wall disposed between the guide wall and the outlet, the impact wall being positioned in proximity to the guide wall to cause a local high pressure region therebetween that promotes separation of oil from crankcase gases passing through the holes in the guide wall.

11. An oil separator as set forth in claim 10, wherein the impact wall and guide wall are planar and substantially parallel to each other.

12. An oil separator as set forth in claim 1, wherein the plurality of holes are arranged in rows, such that movement of the plate between the open and closed positions opens and closes, respectively, successive rows of holes.

* * * * *

UNITED STATES PATENT AND TRADEMARK OFFICE
CERTIFICATE OF CORRECTION

PATENT NO.         : 7,258,111 B2  
APPLICATION NO. : 11/492427  
DATED                : August 21, 2007  
INVENTOR(S)      : Teng-Hua Shieh et al.

Page 1 of 1

It is certified that error appears in the above-identified patent and that said Letters Patent is hereby corrected as shown below:

Column 4, line 48, replace "if holes 76" with -- of holes 76 --

Column 6, line 4, replace "An-oil" with -- An oil --

Signed and Sealed this

Fourth Day of December, 2007

JON W. DUDAS  
*Director of the United States Patent and Trademark Office*